T. W. HICKS.
PLANTER.
APPLICATION FILED JAN. 15, 1917.
1,231,353.
Patented June 26, 1917.
2 SHEETS—SHEET 1.
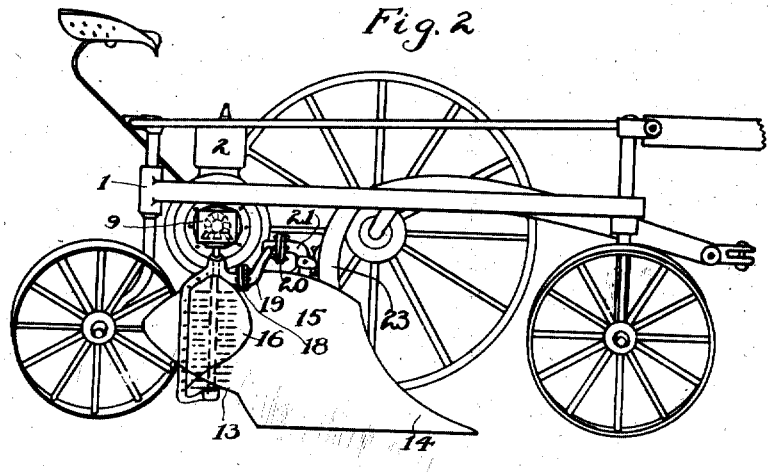
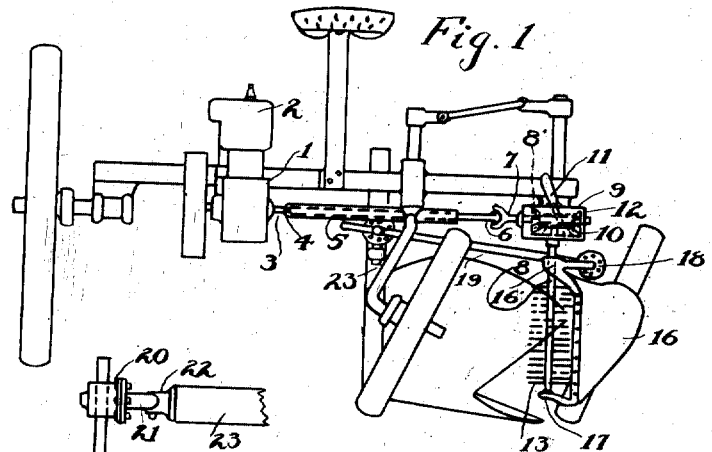
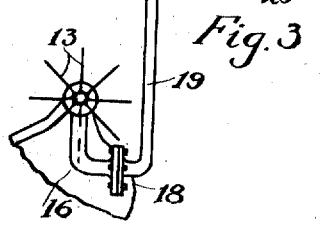
inventor:
Thomas W. Hicks.
by C. B. Enochs
Attorney

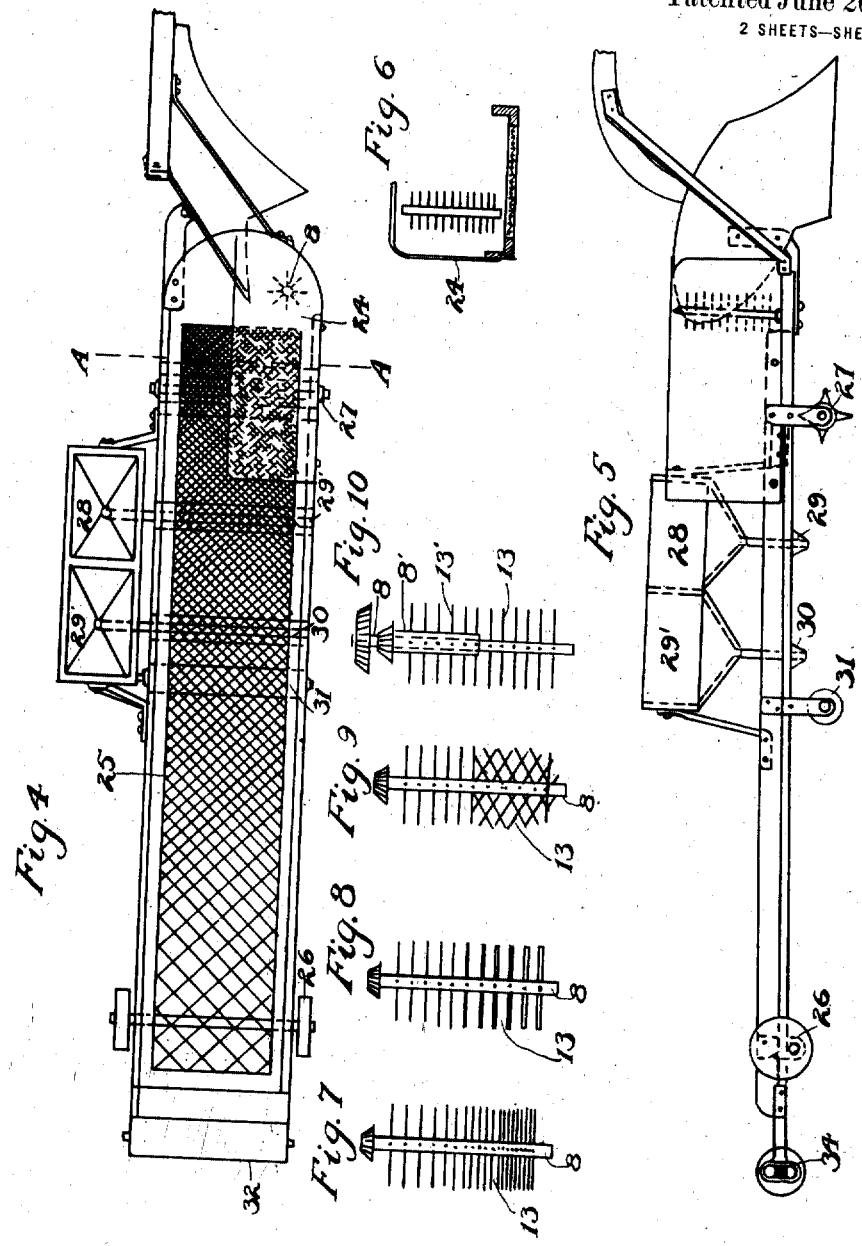

UNITED STATES PATENT OFFICE.

THOMAS W. HICKS, OF MINNEAPOLIS, MINNESOTA, ASSIGNOR TO SCIENTIFIC FARMING MACHINERY COMPANY, OF MINNEAPOLIS, MINNESOTA, A COMMON LAW COMPANY.

PLANTER.

1,231,353.  Specification of Letters Patent.  Patented June 26, 1917.

Original application filed August 21, 1916, Serial No. 116,148. Divided and this application filed January 15, 1917. Serial No. 142,567.

*To all whom it may concern:*

Be it known that I, THOMAS W. HICKS, a citizen of the United States, and a resident of Minneapolis, in the county of Hennepin and State of Minnesota, have invented new and useful Improvements in Planters, of which the following is a specification.

This application is a divisional of my co-pending application entitled Tillers, filed August 21, 1916, Serial #116148.

One object of my invention is to provide means for introducing seed into the earth in a horizontal plane at a predetermined depth in the finished seed-bed.

Another object of my invention is to provide means for depositing fertilizer in a pulverized soil at a predetermined relative position to the seed planted or to be planted therein.

Another object of my invention is to provide means for packing the root section of the seed-bed after the seed have been planted and depositing on the seed-bed so packed a portion of the pulverized soil.

With these and incidental objects in view, the invention consists of certain novel features of construction and combinations of parts, the essential elements of which are hereinafter described with the reference to the drawings which accompany and form a part of this specification.

In the drawings Figure 1 is an end view of a portion of a common type of plow with a tiller such as that disclosed in my co-pending application #116148 applied thereto.

Fig. 2 is a side elevation of a portion of the same plow and Fig. 3 is an enlarged detail of the adjustable rotor support.

Fig. 4 is a plan view of the plow, rotor, screen, seed and fertilizer attachments and Fig. 5 is a side elevation of the same. Fig. 6 is a section taken on the line AA Fig. 4 and Fig. 7 is a side elevation of my preferred construction of rotor.

Figs. 8, 9 and 10 are side elevations of modifications of the rotor.

While the tiller is disclosed and claimed in my co-pending application Serial #116148, some method of pulverizing the soil is required in my improved type of planter, and a description of the operation of the tiller which is one means of providing such pulverized soil is incorporated in this specification.

In order to produce the best crop results, the soil should be worked to a certain depth in such a manner as to be finely pulverized and for most crops, the granules of the pulverized soil should be smaller at the bottom or root section of the completed bed and increase in size to the surface section of the bed; moreover, the sub-soil or under surface from which the soil has been removed to be worked and upon which it is again deposited, should be punctured so as to give a more intimate relation between the root section and the sub-soil.

The seed should be deposited in the prepared bed at a uniform depth and among granules of the proper size for the seed used. Fertilizer should be deposited at a uniform depth below or above the seed, or both, and when the seeds have been deposited and a small amount of pulverized dirt deposited thereover, the root section should be packed and the remainder of the soil then deposited on the packed root section.

In Figs. 1 and 2, 1 is the ordinary plow frame and 2 is a gasolene engine carried thereon. Driven by the engine shaft 3 through the universal joint 4, splined shaft connection 5, universal joint 6 and driving shaft 7, the rotor shaft 8 may be driven either clock-wise or anti-clockwise through the engagement of the pinions 9 and 10 respectively with the driving gear 8'.

A gear shaft 11 controlling the sleeve 12 carrying the pinions 9 and 10 splined to the driving shaft 7, facilitates the reversal of the rotor shaft.

Carried on the rotor shaft 8 is a plurality of prongs better shown in Fig. 3, and when the soil, turned by the plowshare 14 and mold board 15 is brought into contact with the prongs 13 which are driven at a comparatively high velocity, the soil is pulverized and any roots or litter finely disintegrated and sent upward and backward against the shield 16, from which it falls in a uniform shower either back to the surface of the sub-soil or onto the screen 25.

The rotor shaft is journaled to the frame at 16' and 17 and this frame is supported by an adjustable bracket comprising a flange connection 18, Fig. 3, an arm 19, a flange connection 20, an L shaped adjustable arm 21 and an adjustable bracket 22 bolted to the frame member 23 to allow the positioning of the rotor at any desired angle.

As heretofore stated it is ordinarily preferable to have the pulverized soil deposited back onto the sub-soil so the finer granules rest on the sub-soil and form a root section and the coarser granules deposited thereon in gradually increasing size to the surface of the completed bed, and I accomplish this by utilizing the type of rotor as shown in Figs. 7, 8, 9 and 10.

The stratifying may be accomplished entirely by these rotors or a shield 24 may be employed to throw the pulverized soil from the rotor onto the forward end of the screen 25 Fig. 4 from which end it may be worked by any suitable means backwardly along the screen, which it will be noted is of a fine mesh toward the front end, and a coarse mesh toward the rear end, to allow various sizes of pulverized soil to pass through it at different points along its length.

An eccentrically mounted pair of wheels 26 support the rear end of the screen and serve to assist in working the soil backwardly over the face of the screen by agitating the screen as it is drawn forwardly over the earth.

It is evident that with this screen, soil of small granules will be dropped from the front end and covered by the larger size of granules as the screen is drawn forwardly.

A spiked roller 27 or a series of disks, if preferred, follow the rotor shaft and puncture the sub-soil before the pulverized soil is dropped back thereon so the finely pulverized soil will drop into the holes or slots made in the sub-soil and establish a more intimate relation between the sub-soil and the root section of the seed bed.

A hopper 28 having dropping means 29 will deposit seed and as a portion of the finer worked soil has been dropped through the screen between the hopper 28 and the forward end of the screen this seed will be deposited in a plane at a uniform depth from the surface of the sub-soil and will be covered by the pulverized soil dropped from the back portion of the screen as it passes over the surface where the seed have been dropped.

A second hopper 29' with dropping attachment 30 will deposit suitable fertilizer as the machine is drawn forward and it is evident the seed will be covered by a definite amount of pulverized soil before the fertilizer is deposited, and the fertilizer will in turn be covered by a definite amount of soil.

A weighed roller 31 follows and packs the root section which then receives the remainder of the pulverized soil on the packed root section and the finished seed bed may be packed by an additional weighing roller 32 if desired.

It is evident that any desired number of hoppers for fertilizer may be used and these may be positioned in front of as well as behind the seeding attachment.

It is also to be remembered that the screen may be removed from the frame and the stratification of the soil be accomplished by the rotors alone and the seeding hopper and the fertilizer hopper so positioned rearwardly of the rotor that seed or fertilizer or both may be deposited exactly the same with respect to the worked soil as heretofore described, although I prefer to use a screen as I find it more positive in positioning the various strata of soil.

While I have described my invention and illustrated it in several forms, I do not wish myself to be understood as confining myself to these particular constructions, as it is evident that my invention may be embodied in various ways and different constructions within the scope of the following claims.

Claims:

1. In a planter, the combination of means for pulverizing soil, and means for introducing seed into the soil so pulverized as it is deposited back upon the sub-soil.

2. In a planter, the combination of means for lifting and pulverizing a certain amount of soil and means for introducing into the soil so lifted and pulverized, seed at a definite distance from the sub-soil during the act of returning of the pulverized soil to the sub-soil.

3. In a planter the combination of means for lifting and pulverizing a portion of the soil, means for depositing seed therein during the act of returning the soil to the earth and means for introducing fertilizer into said soil during the act of its being returned to the sub-soil.

4. In a planter, the combination of means for lifting a portion of the soil, pulverizing the soil so lifted, means for depositing the soil so pulverized in strata having substantially uniform sized granules in each strata and means for introducing seed into the soil so deposited at a predetermined depth from the surface of the finished field.

5. In a planter, the combination of means for lifting a portion of the soil, pulverizing the soil so lifted, means for depositing the soil so pulverized in strata having substantially uniform sized granules in each strata and means for introducing seed into the soil so deposited at a predetermined depth from the surface of the finished field.

6. In a planter, the combination of means for lifting and pulverizing a portion of the soil and depositing the soil so pulverized back onto the sub-soil, and means for introducing seed into the soil at a pre-determined depth from the surface of the finished field, on top of a portion of the soil so deposited but before the depositing of the remainder of the pulverized soil.

7. In a planter the combination of means for lifting, pulverizing, and depositing back onto the subsoil a portion of the soil; means for introducing seed into the soil as it is being deposited back onto the surface of the subsoil so that a portion of the pulverized soil will be below the seed and a portion above the seed.

8. In a planter, the combination of means for lifting pulverizing and depositing back onto the sub-soil a portion of the soil, and means for introducing fertilizer onto a portion of the soil deposited, said first mentioned means covering the fertilizer with the remainder of the soil so deposited during the act of depositing the pulverized soil.

9. In a planter, the combination of means for lifting and pulverizing a portion of the soil, said means also depositing the pulverized soil onto the subsoil with part of the soil falling before the remainder of the soil, means for introducing seed onto a portion of the soil so deposited, the seed so deposited being covered by the soil deposited later, and means for packing the seed bed so formed.

10. In a planter the combination of means for lifting, pulverizing, and depositing back onto the subsoil a portion of the soil, said act of depositing extending over a certain interval of time, means for introducing seed onto a portion of the soil so deposited during said interval of time, the seed being covered by a further portion of the soil so deposited, means for packing the seed bed so formed, the packed seed bed being covered with the remainder of the pulverized soil deposited in said interval of time.

11. In a planter, the combination of means for lifting and pulverizing a portion of the soil, means for puncturing the subsoil before the pulverized dirt falls back thereon, and means for introducing seed among the pulverized granules as they fall back onto the sub-soil.

12. In a planter the combination of means for lifting, pulverizing and depositing onto the subsoil a portion of the soil, said act of depositing extending over a certain interval of time, means for introducing seed onto a portion of the soil so deposited forming a root section, means for packing the root section, the packed root section being covered with a portion of the soil, deposited during the remainder of said interval of time.

THOMAS W. HICKS.